United States Patent
Morishige et al.

(10) Patent No.: US 11,970,750 B2
(45) Date of Patent: Apr. 30, 2024

(54) NON-ORIENTED ELECTRICAL STEEL SHEET AND METHOD FOR MANUFACTURING NON-ORIENTED ELECTRICAL STEEL SHEET

(71) Applicant: NIPPON STEEL CORPORATION, Tokyo (JP)

(72) Inventors: Nobusato Morishige, Tokyo (JP); Takeru Ichie, Tokyo (JP); Masato Yasuda, Tokyo (JP); Masahide Urago, Tokyo (JP); Fuminobu Murakami, Tokyo (JP); Daichi Hamada, Tokyo (JP); Atsushi Shibayama, Tokyo (JP); Kazumi Mizukami, Tokyo (JP); Daisuke Itabashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/269,435

(22) PCT Filed: Mar. 31, 2022

(86) PCT No.: PCT/JP2022/016651
§ 371 (c)(1),
(2) Date: Jun. 23, 2023

(87) PCT Pub. No.: WO2022/211053
PCT Pub. Date: Oct. 6, 2022

(65) Prior Publication Data
US 2023/0392225 A1    Dec. 7, 2023

(30) Foreign Application Priority Data

Mar. 31, 2021    (JP) ................. 2021-060959

(51) Int. Cl.
| | | |
|---|---|---|
| *C21D 8/12* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |

(52) U.S. Cl.
CPC ......... *C21D 8/1222* (2013.01); *C21D 8/1233* (2013.01); *C21D 8/1272* (2013.01); *C21D 8/1277* (2013.01); *C21D 9/46* (2013.01); *C22C 38/002* (2013.01); *C22C 38/02* (2013.01); *C22C 38/04* (2013.01); *C22C 38/06* (2013.01)

(58) Field of Classification Search
None
See application file for complete search history.

(56) References Cited

U.S. PATENT DOCUMENTS

| | | |
|---|---|---|
| 2020/0087748 A1 | 3/2020 | Lee et al. |
| 2020/0190639 A1 | 6/2020 | Nakajima et al. |
| 2021/0159002 A1 | 5/2021 | Okubo et al. |
| 2022/0018002 A1 | 1/2022 | Lee et al. |

FOREIGN PATENT DOCUMENTS

| | | |
|---|---|---|
| JP | 2003-193141 A | 7/2003 |
| JP | 2014-196559 A | 10/2014 |
| JP | 2018-204052 A | 12/2018 |
| JP | 2019-99827 A | 6/2019 |
| JP | 2020-509182 A | 3/2020 |
| WO | WO 2018/097006 A1 | 5/2018 |
| WO | WO 2020/111570 A1 | 6/2020 |
| WO | WO 2021/261515 A1 | 12/2021 |

OTHER PUBLICATIONS

"Highly purified hydrochloric acid", Japanese Industrial Standard, JIS K 9902-1994, 1994, pp. 1-16.
Takata, "Determination of Trace Impurities in Highly Purified Reagent", TOSOH Research & Technology Review (the TOSOH research and technical report), TOSOH, 2010, vol. 54, pp. 25-33.

*Primary Examiner* — Anthony M Liang
(74) *Attorney, Agent, or Firm* — Birch, Stewart, Kolasch & Birch, LLP

(57) ABSTRACT

There is provided a non-oriented electrical steel sheet in which, in a cross section of a base material in a sheet thickness direction, the number density $N_{2-5}$ of precipitates with an equivalent circle diameter of 50 to 500 nm present in a range of 2.0 to 5.0 μm from the surface of the base material in the sheet thickness direction is 0.30 pieces/μm² or less, and the relationship between the number density $N_{2-5}$ and the number density $N_{0-2}$ of precipitates with an equivalent circle diameter of 50 to 500 nm present in a range from the surface of the base material to 2.0 μm satisfies Formula (1):

$$(N_{2-5})/(N_{0-2}) \leq 0.5 \quad \text{Formula (1).}$$

12 Claims, No Drawings

NON-ORIENTED ELECTRICAL STEEL SHEET AND METHOD FOR MANUFACTURING NON-ORIENTED ELECTRICAL STEEL SHEET

TECHNICAL FIELD

The present invention relates to a non-oriented electrical steel sheet and a method for manufacturing a non-oriented electrical steel sheet. Priority is claimed on Japanese Patent Application No. 2021-060959, filed Mar. 31, 2021, the content of which is incorporated herein by reference.

BACKGROUND ART

A non-oriented electrical steel sheet contains about 2 mass % to 5 mass % of Si in the case of a high grade. In this case, crystal axis orientations of crystals are arranged as randomly as possible so that magnetic characteristics biased toward a specific orientation of the steel sheet are not exhibited. Such non-oriented electrical steel sheets have excellent magnetic characteristics, and are used, for example, as iron core materials for stators and rotors of rotating machines.

In such non-oriented electrical steel sheets, various developments have been made in order to improve magnetic characteristics. Particularly, with the recent demand for energy saving, there is a demand for further reduction in iron loss. The iron loss is composed of an eddy current loss and a hysteresis loss.

In order to reduce the eddy current loss, it is effective to add elements such as Si, Al, and Mn as steel components to increase specific resistance. In addition, in order to reduce the hysteresis loss, it is effective to reduce the amount of impurities and precipitates in the steel.

However, when Al is added as a steel component, the eddy current loss is reduced, but AlN precipitates are formed in the steel, and there is a problem of the hysteresis loss deteriorating.

Patent Document 1 discloses a technology, for manufacturing a non-oriented electrical steel sheet in which the number density of Al-based precipitates near the surface is controlled by controlling a gas component in the final annealing. Patent Document 2 and Patent Document 3 disclose a technology for manufacturing an oriented electrical steel sheet having excellent coating properties by controlling hot-rolled sheet annealing conditions and pickling treatment conditions. In addition, Patent Document 4 discloses a technology for manufacturing an oriented electrical steel sheet having excellent coating properties and magnetic characteristics by controlling pickling treatment conditions, annealing separator additive conditions and final annealing conditions.

CITATION LIST

Patent Document

[Patent Document 1] Japanese Unexamined Patent Application, First Publication No. 2018-204052
[Patent Document 2] Japanese Unexamined Patent Application, First Publication No. 2003-193141
[Patent Document 3] Japanese Unexamined Patent Application, First Publication No. 2019-99827
[Patent Document 4] Japanese Unexamined Patent Application, First Publication No. 2014-196559

DISCLOSURE OF THE INVENTION

Problems to be Solved by the Invention

Due to the growing concern about the global environmental problem in recent years, electronic devices are required to have smaller sizes, higher outputs, and higher energy efficiency, and it is required to further reduce the iron loss for non-oriented electrical steel sheets, which are iron core materials for motors.

Patent Document 1 discloses a technology for controlling the number density of Al-based precipitates of 50 to 500 nm present in, a range from the surface to a depth of 2.0 μm by controlling a gas component in the final annealing. The reason why it is limited to the range of 50 to 500 nm is that the precipitate size that affects iron loss, particularly, hysteresis loss, is 50 to 500 nm. However, the control of AlN precipitates on the inner layer side from a depth of 2.0 μm is not sufficient. If the control of AlN precipitates inside the steel sheet is insufficient, the problem of hysteresis loss deteriorating occurs. In addition, Patent Documents 2 to 4 disclose, as a method for obtaining an oriented electrical steel sheet having excellent magnetic characteristics and/or excellent film adhesion, making the concentration of Mn or Cu different between the surface and the center of the sheet, thickness. However, the control of AlN precipitates may not be sufficient, Here, the present invention has been made in view of the above problems, and an object of the present invention is to provide a non-oriented electrical steel sheet with low iron loss and excellent magnetic characteristics and a method for manufacturing the same.

Means for Solving the Problem

In order to address the above problems, the present invention provides the following aspects.
(1) A non-oriented electrical steel sheet including a base material, the base material containing, as chemical components, in mass %,
C: 0.005% or less,
Si: 2.0% or more and 4.5% or less,
Mn: 0.01% or more and 5.00% or less,
a total amount of one, two or more of S, Se and Te: 0.0003% or more and 0.0050% or less,
Al: 0.01% or more and 5.00% or less,
N: 0.0005% or more and 0.0050% or less, and
P: 1.0% or less, with the remainder being of Fe and impurities,
wherein, in a cross section of the base material in a sheet thickness direction, the number density $N_{2-5}$ of precipitates with an equivalent circle diameter of 50 to 500 nm present in a range of 2.0 to 5.0 μm from the surface of the base material in the sheet thickness direction is 0.30 pieces/μm² or less, and
wherein the relationship between the number density $N_{2-5}$ and the number density $N_{0-2}$ of precipitates with an equivalent circle diameter of 50 to 500 nm present in a range from the surface of the base material to 2.0 μm satisfies Formula (1):

$$(N_{2-5})/(N_{0-2}) \leq 0.5 \qquad \text{Formula (1)}$$

(2) The non-oriented electrical steel sheet according to (1), wherein the chemical components of the base material further contain, in mass %, one, two, or more selected from the group consisting of Cu: 1.0% or less,
Sn: 1.0% or less,
Ni: 1.0% or less,
Cr: 1.0% or less, and
Sb: 1.0% or less.
(3) The non-oriented electrical steel sheet according to (1) or (2),
wherein the chemical components of the base material further contain, in mass %, one, two or more selected from the group consisting of
Ti: 0.0010 or more and 0.0030% or less,
Nb: 0.0010 or more and 0.0030% or less,
V: 0.0010 or more and 0.0030% or less, and
Zr: 0.0010 or more and 0.0030% or less.
(4) The non-oriented electrical steel sheet according to any one of (1) to (3),
wherein the iron loss $W_{15/50}$ is 2.5 W/kg or less, and the relationship between the iron loss $W_{15/50}$ and the hysteresis loss $W_{15h}$ satisfies Formula (2):

$$0.8 \leq (W_{15h})/(W_{15/50}) \quad \text{Formula (2)}$$

(5) A method for manufacturing the non-oriented electrical steel sheet according to any one of (1) to (4), including
a process in which molten steel is cast to obtain a slab;
a hot rolling process in which the slab is heated and then hot-rolled to form a hot-rolled steel sheet;
a pickling process in which the hot-rolled steel sheet is pickled to obtain a pickled sheet;
a cold rolling process in which the pickled sheet is cold-rolled to obtain a cold-rolled steel sheet; and
a final annealing process in which the cold-rolled steel sheet is subjected to final annealing,
wherein a pickling solution used in the pickling process contains one, two or more of Cu, Hg, Ag, Pb, Cd, Co, Zn, and Ni and has a total concentration of respective elements of 0.00001% or more and 1,00000% or less in mass %, a pH of −1.5 or more and less than 7.0, and a liquid temperature of 15° C. or higher and 100° C. or lower, and pickling is performed for a time of 5 seconds or longer and 200 seconds or shorter for which the hot-rolled steel sheet comes into contact with the pickling solution.
(6) The method for manufacturing a non-oriented electrical steel sheet according to (5), including a hot-rolled sheet annealing process in which the hot-rolled steel sheet is subjected to hot-rolled sheet annealing to obtain a hot-rolled annealed sheet between the hot rolling process and the pickling process.

Effects of the Invention

According to the above aspects of the present invention, it is possible to provide a non-oriented electrical steel sheet with low iron loss and excellent magnetic characteristics and a method for manufacturing the same.

EMBODIMENT(S) FOR IMPLEMENTING THE INVENTION

In order to reduce hysteresis loss in a non-oriented electrical steel sheet, the inventors conducted extensive studies regarding a method of controlling precipitates, particularly, on the surface layer, and as a result, found the following findings.

A solution containing one, two or more of Cu, Hg, Ag, Pb, Cd, Co, Zn and Ni (these may be referred to as "Cu-Group Element(s)" in this specification) is brought into contact with a non-oriented electrical steel sheet. The non-oriented electrical steel sheet contains MnS, MnSe, and MnTe (these may be referred to as "MnS-Group Precipitate(s)" in this specification) as precipitates, and like other precipitates such as AlN, the MnS-Group Precipitates have a function of deteriorating hysteresis loss. In the present invention, if the MnS-Group Precipitate come into contact with a solution containing Cu-Group Element, utilizing a phenomenon in which some of Mn in MnS-Group Precipitates, particularly, Mn on the surface layer of MnS-Group Precipitates, is replaced with Cu-Group Element, when composite precipitation of MnS-Group Precipitates and AlN precipitates is promoted, the number of precipitates is reduced, and thus low iron loss can be achieved.

Hereinafter, preferable embodiments of the present invention will be described, in detail.

Here, unless otherwise specified, the notation "a to b" for numerical values a and b means "a or more and b or less." In such notation, a unit indicated only on the numerical value b also applies to the numerical value a. In addition, any numerical value indicated with "less than" or more than is excluded from the numerical value range.

Hereinafter, the non-oriented, electrical steel sheet according to the present embodiment will be described in detail.

[Chemical Components]

First, chemical components of the base material of the non-oriented electrical steel sheet according to the present embodiment will be described. Here, in the following, unless otherwise specified, the notation "%" represents "mass %." In addition, the remainder of other elements described below includes Fe and impurities. Here, impurities are components that are contained in raw materials or components that are mixed in during a manufacturing process, and are components that are not intentionally contained in the base material steel sheet. In addition, the chemical components of the slab, which is a raw material of the non-oriented electrical steel sheet, are basically the chemical components of the non oriented electrical steel sheet.

C: 0.005% or less

C is not preferable because it can cause magnetic aging in the final non-oriented electrical steel sheet. Therefore, the content of C is 0.005% or less and preferably or less. In addition, a lower content of C is preferable, hut in consideration of cost, the lower limit may be 0.0005% or more.

Si: 2.0% or more and 4.5% or less

Si increases the electrical resistance of the non-oriented electrical steel sheet and thus reduces the eddy current loss, which is one cause of iron loss. If the content of Si is less than 2.0%, this is, not preferable because it is difficult to sufficiently reduce the eddy current loss of the final non-oriented electrical steel sheet. If the content of Si is more than 4.5%, this is not preferable because the processability deteriorates. Therefore, the content of Si is 2.0% or more and 4.5% or less, preferably 2.2% or more and 4.5% or less, and more preferably 2.4% or more and 4.5% or less.

The lower limit of Si is particularly preferably 2.8% or more.

Mn: 0.01% or more and 5.00% or less

Like Si, Mn has a function of increasing electrical resistance and reduces the eddy current loss, which is one cause of iron loss, forms precipitates with S, Se and Te, and promotes AlN precipitation in the surface layer region of the surface of the steel sheet in combination with pickling conditions to be described below. If the content, of Mn is less than 0.01%, this is not preferable because the effect of reducing the eddy current loss is not sufficient. In addition, this is not preferable because the absolute amount of MnS MnSe and MnTe for promoting AlN precipitation in the surface layer region is insufficient. If the content of Mn is more than 5.0%, this is not preferable because the processability deteriorates. Therefore, the content of Mn is 0.01% or more and 5.00% or less.

Total amount of one, two or more of S, Se and Te: a total amount of 0.0003% or more and 0.0050% or less S, Se and Te form precipitates together with Mn described above, and promote AlN precipitation in the surface layer region in combination with pickling conditions to be described below. All three of S, Se and Te may be contained in the non-oriented electrical steel sheet, or at least one of them may be contained in the non-oriented electrical steel sheet. If the total content of S, Se and Te is less than 0.0003%, this is not preferable because the absolute amount of MnS, MnSe and MnTe for promoting AlN precipitation in the surface layer region of the surface of the steel sheet is insufficient. If the total content of S, Sc and Te is more than 0.0050%, this is not preferable because the precipitation amount of MnS, MnSe and MnTe is too large, and the hysteresis loss deteriorates. Therefore, the content of one, two or more of S, Se and Te is a total amount of 0.0003% or more and 0.0050% or less, preferably 0.0003% or more and or less, and more preferably 0.0003% or more and 0.0030% or less.

Al: 0.01% or more and 5.00% or less

Like Si, Al has a function of increasing electrical resistance and reduces the eddy current loss, which is one cause of iron loss. In addition, Al forms AlN precipitates that deteriorate hysteresis loss in the steel together with N to be described below. If the content of Al is less than 0.01%, this is not preferable because the effect of reducing the eddy current loss is not sufficient. If the content of Al is more than 5.00%, this is not preferable because the processability deteriorates. Therefore, the content of Al is 0.01% or more and 5.00% or less, and preferably 0.01% or more and 4.00% or less.

N: 0.0005% or more and 0.0050% or less

As described above, N forms AlN together with acid-soluble Al and deteriorates hysteresis loss. If the content of N is less than 0.0005%, this is not preferable because the manufacturing cost is too high. If the content of N is more than 0.0050%, this is not preferable because the amount of AlN precipitates is too large and hysteresis loss deteriorates, Therefore, the content of N is 0.0005% or more and 0.0050% or less, preferably 0.0010% or more and 0.0040% or less, and more preferably 0.0010% or more and 0.0030% or less.

P: 1.0% or less

P has a function of increasing the strength without lowering the magnetic flux density. However, if the content of P is excessive, the toughness of the steel is impaired, and the steel sheet is likely to break. Therefore, the upper limit of the amount of P is 1.0%, preferably 0.150% or less, and more preferably 0.120% or less. The lower limit of the amount of P is not particularly limited, and may be 0.001% or more in consideration of manufacturing cost.

Each content of any one, two or more of Cu, Sn, Ni Cr, and Sb: 0% or more and 1.0% or less In addition to the above elements, one, two or more selected from the group consisting of Cu, Sn, Ni, Cr, and Sb, which are elements that improve the texture and improve the magnetic flux density as the group A elements, may be additionally contained in each of contents of 0% or more and 1.0% or less. Each content of these elements is preferably 0.0005% or more and 0.3000% or less.

each content of any one, two or more of Ti, Nb, V, and Zr: 0.0010% or more and 0.0030% or less In addition, as the group B elements, additionally, one, two or more selected from the group consisting of Ti, Nb, V, and Zr, which are elements that form precipitates with N in the steel and inhibit AlN precipitation may be contained in each of contents of 0.0010% or more and 0.0030% or less. If the slab contains the above elements, the grain growth of the manufactured non-oriented electrical steel sheet can be further improved and the hysteresis loss can be reduced. On the other hand, if the content is larger than 0.0030%, since the amount of precipitates in the steel increases, and the hysteresis loss may actually deteriorate, each content of one, two or more selected from the group consisting of Ti Nb, V, and Zr may be 0.0030% or less.

<Precipitate>

The term, "precipitate" here refers to a composite precipitate of MnS and AlN.

The inventors found that the number density of precipitates present in a range of 2.0 to 5.0 μm from the surface of the steel sheet in the sheet thickness direction has a great effect on the hysteresis loss. Although the detailed mechanism is unknown, when the formation of precipitates is promoted in a range of 0.0 μm to 2.0 μm of the outermost surface layer from the surface of the steel sheet in the sheet thickness direction, and the number density of precipitates present in a range of 2.0 to 5.0 μm from the surface of the steel sheet in the sheet thickness direction is reduced, a non-oriented electrical steel sheet having excellent hysteresis loss can be obtained. Here, the inventors found that the number density of precipitates present in a range of 2.0 to 5.0 μm has a greater effect on the hysteresis loss than the number density of precipitates of the outermost surface layer in a range of 0.0 μm to 2.0 μm of the outermost surface layer.

In the cross section of the base material of the finally-annealed sheet (product sheet) in the sheet, thickness direction, the number density $N_{2-5}$ of precipitates with an equivalent circle diameter of 50 to 500 nm present in a range of 2.0 to 5.0 μm from the surface of the steel sheet (base material) in the sheet thickness direction is 0.30 pieces/μm² or less and the relationship of the number density $N_{0-2}$ of precipitates with an equivalent circle diameter of 50 to 500 nm present in a range from the surface of the base material to 2.0 μm satisfies Formula (1).

$$(N_{2-5})/(N_{0-2}) \leq 0.5 \qquad \text{Formula (1):}$$

If the number density of precipitates with an equivalent diameter of 50 to 500 nm present in a range of 2.0 to 5.0 μm from the surface of the steel sheet in the sheet thickness direction is more than 0.30 pieces/μm², this is not preferable because the hysteresis loss deteriorates. In addition, if the ratio of $N_{2-5}$: the number density of precipitates with an equivalent circle diameter of 50 to 500 nm present in a range of 2.0 to 5.0 μm from the surface of the steel sheet (base material) in the sheet thickness direction to $N_{0-2}$: the number density of precipitates with an equivalent circle diameter of 50 to 500 nm present in a range from the surface of the base material to 2.0 μm is more than 0.5, this is not preferable because the hysteresis loss deteriorates. Therefore, $(N_{2-5})/(N_{0-2})$ is 0.5 or less, and more preferably 0.4 or less.

Precipitates contained in the non-oriented electrical steel sheet may be identified using Transmission Electron Microscope-Energy Dispersive X-ray Spectroscopy (TEM-EDS) or Scanning Electron Microscope-Energy Dispersive X-ray Spectroscopy (SEM-EDS). For example, a thin film sample whose observation surface is a cross section parallel to the rolling direction and the sheet thickness direction is collected from the hot-rolled steel sheet, and based on observation and quantitative analysis results obtained through TEM-EDS or SEM-EDS precipitates composed of elements that can form precipitates in the steel can be identified in the observation field. The diameter when the area of the identified precipitate is converted into a circle is defined as the equivalent circle diameter. A sample whose observation field (observation area) includes a range of 5.0 μm from the surface of the steel sheet in the sheet thickness direction is prepared, and precipitates with an equivalent circle diameter of 50 to 500 nm present in a range of 5.0 μm from the surface of the steel sheet in the sheet thickness direction are identified, for example, the observation field may be in a range of at least 5 μm×10 μm. Here, in order to derive the equivalent circle diameter, an image obtained by TEM-EDS or SEM-EDS observation may be read by a scanner or other device, and analyzed using commercial image analysis software. In addition, the surface of the steel sheet here refers to the interface between the base material and the insulating coating.

If image analysis software is not used, simply, in a scanned image or a printed image, the maximum length and the minimum length of each precipitate may be visually measured, and the average value thereof may be used as the equivalent circle diameter. Here, the TEM-EDS measurement sample may be a thin piece or a precipitate may be extracted by methods such as a replica method. In the case of the replica method, marking may be applied so that the location on the surface of the steel sheet can be identified during analysis. The SEM-EDS sample may be prepared by polishing the cross section of the steel sheet. An etching, treatment may be performed in order to facilitate identification of precipitates. In SEM observation, a secondary electron image or a backscattered electron image may be used.

<Magnetic Characteristics>

In order to improve magnetic characteristics, in the non-oriented electrical steel sheet according to the present embodiment, the iron loss $W_{15/50}$ and the hysteresis loss $W_{15h}$ may be, additionally controlled. Specifically, in the non-oriented electrical steel sheet according to the present embodiment, the iron loss $W_{15/50}$ is 2.5 W/kg or less, and the relationship between the iron loss $W_{15/50}$ and the hysteresis loss $W_{15h}$ may satisfy Formula (2):

$$0.8 \le (W_{15h})/(W_{15/50}) \quad \text{Formula (2)}$$

Here, magnetic characteristics of the electrical steel sheet such as the magnetic flux density can be measured by known methods. For example, magnetic characteristics of the electrical steel sheet can be measured using a method based on the Epstein test specified in JIS C 2550:2011 or a single sheet magnetic characteristic test method (single sheet tester: SST) specified in JIS C 2556:2015. Here, in research and development, when a steel ingot is formed in a furnace such as a vacuum melting furnace, it is difficult to collect test pieces with the same size as in the actual machine manufacturing. In this case, for example, a test piece having "a width of 55 mm"בa length of 55 mm" may be collected and measured according to a single sheet magnetic characteristic test method. In addition, a correction coefficient may be applied to the measurement result obtained by the single sheet magnetic characteristic test method so that the measured value equivalent to that of the method based, on the Epstein test can be obtained. In the present embodiment, the measurement method according to the single sheet magnetic characteristic test method is used for measurement.

<Metal Structure>

The average ferrite crystal grain size Dave (μm) in the finally-annealed sheet (product sheet) may be 50 μm or more. The average ferrite crystal grain size may be obtained according to JIS G 0551:2020.

<Manufacturing Method>

A slab is formed by casting molten steel adjusted so that the non-oriented electrical steel sheet has the component composition described above, Here, the slab casting method is not particularly limited. In addition, in research and development, when a steel ingot is formed in a furnace such as a vacuum melting furnace, the same effect as when a slab is formed can be confirmed with respect to the above component.

[Hot Rolling Process]

The slab is heated, hot-rolled, and processed into a hot-rolled steel sheet. The slab heating temperature is not particularly limited. The upper limit value of the slab heating temperature is not particularly determined, but in order to prevent S compounds, N compounds and the like that are solid-solutionized again during slab heating from being finely precipitated later and magnetic characteristics from deteriorating, the slab heating temperature may be generally, 1,250° C. or lower and preferably 1,200° C. or lower.

Next, the slab is heated, and then hot-rolled and processed into a hot-rolled steel sheet. The hot rolling finishing temperature may be 700° C. or higher and 1,000° C. or lower, and the winding temperature may be 500° C. or higher and 900° C. or lower. When the hot rolling finishing temperature and the winding temperature are controlled within the above range, precipitation of MnS-Group Precipitates in hot rolling is controlled, and in combination with condition control in pickling performed in the subsequent process, an effect in which the iron loss is further reduced can be obtained. The sheet thickness of the hot-rolled steel sheet after processing may be, for example, 1.5 mm or more and 3.5 mm or less. If the sheet thickness of the hot-rolled steel sheet is less than 1.5 mm, this is not preferable because the shape of the steel sheet after hot rolling is poor. If the sheet thickness of the hot-rolled steel sheet is more than 3.5 mm, this is not preferable because the rolling load in the cold rolling process increases.

[Pickling Process]

A method for manufacturing a non-oriented electrical steel sheet of the present invention includes bringing a pickling solution containing one, two or more of Cu, Hg, Ag, Pb, Cd, Co, Zn, and Ni (these may be referred, to as "Cu-Group Elements" in this specification) and having a total concentration of respective elements of 0.00001% or more and 1.00000% or less into contact with a hot-rolled steel sheet to obtain a pickled sheet.

The hot-rolled steel sheet contains MnS, MnSe, and MnTe (these may be referred to as "MnS-Group Precipitates" in this specification) as precipitates, and these precipitates act as inhibitors. If MnS-Group Precipitates come into contact with the pickling solution containing Cu-Group Element, some of Mn in MnS-Group Precipitates, particularly, Mn on the surface layer of MnS-Group Precipitates is replaced with Cu-Group Element. Utilizing this phenomenon, when composite precipitation of precipitates of MnS-Group Precipitates and AlN precipitates is promoted, the number of precipitates of 2.0 to 5.0 μm from the surface of the steel sheet in the finally-annealed sheet (product sheet) in the sheet thickness direction is reduced, and the low iron loss can be achieved.

The mechanism by which precipitates in the sheet thickness direction can, be controlled by bringing the pickling solution containing Cu-Group Element into contact with the hot-rolled steel sheet is speculated as follows.

The pickling solution contains one, two or more of Cu, Hg, Ag, Pb, Cd, Co, Zn and Ni. These elements have very high affinity with S, Se and Te. These elements are replaced with Mn in the MnS, MnSe and MnTe precipitates exposed to the steel sheet surface of the non-oriented electrical steel sheet in the pickling solution to form compounds. This replacement reaction tends to occur on the side of the surface of, particularly, the precipitates of MnS-Group Precipitates which are in contact with the pickling solution, among the MnS-Group Precipitates. When Mn is replaced with other metal elements (Cu-Group Elements) on the side of the surface of the MnS-Group Precipitates, composite precipitation of MnS-Group Precipitates and AlN precipitates is promoted in the final annealing or the like. Thereby, the number of precipitates from the steel sheet surface to 2.0 μm in the finally-annealed sheet (product sheet) increases, and the number of precipitates on the inner layer side from 2.0 μm from the steel sheet surface (particularly 2.0 μm to 5.0 μm from the surface in, the sheet thickness direction) can be reduced. This reaction occurs when the pickling solution containing one, two or more of Cu, Hg, Ag, Pb, Cd, Co, Zn and Ni comes, into contact with MnS, MnSe and MnTe. In addition, it is thought that, if there are defects such as cracks and voids on the surface layer of the steel sheet, the pickling solution penetrates into the steel sheet through these spaces, and reacts with not only MnS-Group Precipitates exposed on the outermost surface of the steel sheet but also MnS-Group Precipitates in a certain depth range of the surface layer of the steel sheet. In order to promote the reaction of MnS-Group Precipitates in a certain depth range, for example, a range of 10 μm from the surface in the sheet thickness direction, before pickling, defects such as cracks may be introduced into the surface of the steel sheet by a shot blasting treatment or the like. In this case, regarding the distribution state of precipitates after final annealing, the number density of precipitates with an equivalent diameter of 50 to 500 nm present in a range of 2.0 to 5.0 μm from the surface of the steel sheet in the sheet thickness direction may be reduced.

If the total concentration of one, two or more of Cu, Hg, Ag, Pb, Cd, Co Zn and Ni in the pickling solution is less than 0.00001%, this is not preferable because the effect of controlling inhibitors in the sheet thickness direction becomes insufficient. If the total concentration of one, two or more of Cu, Hg, Ag, Pb, Cd, Co, Zn and Ni in the pickling solution is larger than 1.00000%, this is not preferable because the magnetism improving effect is maximized. Therefore, the total concentration of one, two or more of Cu, Hg, Ag, Pb, Cd, Co, Zn and Ni in the pickling solution is 0.00001% or more and 1.00000% or less.

In addition, generally, a lower pH of the pickling solution is preferable. It is thought that, a pickling solution with a low pH has a strong pickling effect, and reacts with not only MnS-Group Precipitates exposed on the outermost surface of the steel sheet but also MnS-Croup Precipitates in a certain depth range of the surface layer of the steel sheet, for example, in a range of 10 μm from the surface in the sheet thickness direction, and affects AlN precipitation in the final annealing or the like. However, if the pH of the solution is less than −1.5, this is not preferable because it becomes too acidic and the solution is difficult to handle. If the pH of the solution is 7.0 or more, the pickling treatment effect may not be sufficiently obtained and the effect of controlling precipitates in the sheet thickness direction may be insufficient. Therefore, the pH of the solution is −1.5 or more and less than 7.0. If the pH of the solution is lower, the pickling effect is stronger and the effect of controlling precipitates in the sheet thickness direction is stronger so that the pH of the solution is preferably −1.5 or more and 6.0 or less and more preferably −1.5 or more and 5.0 or less. Here, acid components contained in the solution include sulfuric acid, hydrochloric acid, nitric acid, phosphoric acid and the like.

In addition, if the liquid temperature of the solution is lower than 15° C., this is not preferable because the pickling treatment effect may not be sufficiently obtained, and the effect of controlling precipitates in the sheet thickness direction becomes insufficient. If the liquid temperature of the solution is higher than 100° C., this is not preferable because the solution is difficult to handle. Therefore, the liquid temperature of the solution is 15° C. or higher and 100° C. or lower.

In addition, if the time for which the hot-rolled steel sheet comes into contact with the solution is shorter than 5 seconds, this is not preferable because the contact time is not sufficient, and the pickling effect is insufficient. If the time for which the steel sheet comes into contact with the solution is longer than 200 seconds, this is not preferable because the facility for contacting becomes long and large. Therefore, the time for which the steel sheet comes into contact with the solution is 5 seconds or longer and 200 seconds or shorter.

[Cold Rolling Process]

As necessary, a hot-rolled sheet annealing process in which the hot-rolled steel sheet is subjected to hot-rolled sheet annealing to obtain a hot-rolled annealed sheet may be provided. The pickled hot-rolled steel sheet is cold-rolled once or cold-rolled a plurality of times with intermediate annealing therebetween for rolling, and is processed into a cold-rolled steel sheet. Here, when cold rolling is performed a plurality of times with intermediate annealing therebetween for rolling, it is possible to omit the preceding hot-rolled sheet annealing. However, when hot-rolled sheet annealing is performed, since the shape of the steel sheet becomes more favorable, it is possible to reduce the possibility of the steel sheet breaking during cold rolling. Here, in order to remove scales attached to the surface of the steel sheet before cold rolling, it is preferable to perform the above pickling. In order to control precipitates in the sheet thickness direction, pickling may be performed at least once after hot rolling and before final annealing. When cold rolling is performed a plurality of times for rolling, it is preferable to perform a pickling treatment before each cold rolling process in order to reduce roller wear in cold rolling. Here, the sheet thickness after final cold rolling is not particularly limited, and in order to reduce iron loss, the sheet thickness may preferably be 0.35 mm or less and more preferably 0.30 mm or less.

In addition, between passes of cold rolling, between rolling roll stands, or during rolling, the steel sheet may be heated at about 300° C. or lower. In such a case, it is possible to improve magnetic characteristics of the final non-oriented electrical steel sheet. Here, the hot-rolled steel sheet may be cold-rolled three times or more for rolling, but performing cold rolling a plurality of times increases manufacturing cost, and thus the hot-rolled steel sheet is preferably cold-rolled once or twice for rolling. Cold rolling may be performed with a tandem mill for rolling or may be performed by reverse rolling with Sendzimir Mill or the like. In the case of reverse rolling, the number of passes in each cold rolling is not particularly limited, but in consideration of manufacturing cost, 9 or less is preferable.

[Final Annealing Process]

The cold-rolled steel sheet is subjected to final annealing. The atmosphere gas composition in the final annealing is not particularly limited. The rate of temperature increase and the temperature increase heat pattern are not particularly limited. In order to obtain a suitable average ferrite crystal grain size, the annealing temperature is preferably 900° C. or higher. For example, the annealing time at 800° C. or higher may be seconds or longer and 300 seconds or shorter.

Then, as necessary, an insulation coating can be formed on the surface to form a non-oriented electrical steel sheet of the present invention.

According to the above processes, a final non-oriented electrical steel sheet can be manufactured. According to the manufacturing method of the present embodiment, a non-oriented electrical steel sheet having excellent magnetic characteristics can be manufactured.

EXAMPLES

Hereinafter, a method for manufacturing a non-oriented electrical steel sheet and a non-oriented electrical steel sheet according to one embodiment of the present invention will be described in more detail with reference to examples. Here, the following examples are only examples of the non-oriented electrical steel sheet according to the present embodiment, and the non-oriented electrical steel sheet according to the present embodiment is not limited to the following examples.

Example 1

Alloys (steels Nos. A1 to A25 and a1 to a11) having chemical components shown in Table 1 were melted in a laboratory. Here, in Table 1, the contents of Cu, Sn, Ni, Cr, and Sb are listed in the column of group A elements. Similarly, the contents of Ti, Nb, V, and Zr are listed in the column of group B elements, After the above alloy was hot-rolled to have a thickness of 2.0 mm, hot-rolled sheet annealing was performed according to Table 2 to obtain a pickled sheet under pickling conditions shown in Table 2. (Manufacturing Methods Nos. B9 and B10) Then, the pickled sheet was subjected to cold rolling to have a thickness of 0.3 mm and subjected to final annealing to obtain a non-oriented electrical steel sheet. A test piece was cut out from the non-oriented electrical steel sheet after final annealing, and magnetic characteristics were measured according to the single sheet magnetic characteristic test method in JIS C 2556:2015. Here, the magnetic measured value was an average value in the rolling direction and the direction perpendicular to the rolling direction. Here an example in which the iron loss $W_{15/50}$ was 2.5 W/kg or less and $(W_{15h})/(W_{15/50})$ was 0.8 or more was taken as an acceptable line. For precipitates, a thin film sample whose observation surface was a cross section parallel to the rolling direction and the sheet thickness direction was collected, and observed through TEM-EDS. In the obtained observation image, the maximum length and the minimum length of each precipitate present in a range of 2.0 μm from the surface of the steel sheet in the sheet thickness direction and in a range of 2.0 to 5.0 μm from the surface of the steel sheet in the sheet thickness direction were visually measured, and the number density of precipitates having an average value of 50 to 500 nm was measured. It was confirmed through TEM-EDS that the measured precipitate was a composite precipitate of MnS and AlN. The observation field was in a range of 5 μm×10 μm.

TABLE 1

| | | Chemical components (mass %) remainder: Fe and impurities | | | | | | | | | | | |
|---|---|---|---|---|---|---|---|---|---|---|---|---|---|
| | Steel No. | C | Si | Mn | P | S | Se | Te | Seq | Al | N | Group A elements | Group B elements | Note |
| Invention Example | A1 | 0.005 | 2.70 | 0.20 | 0.010 | 0.0020 | — | — | 0.0020 | 0.50 | 0.0020 | — | — | |
| | A2 | 0.003 | 2.00 | 0.20 | 0.010 | 0.0020 | — | — | 0.0020 | 0.50 | 0.0020 | — | — | |
| | A3 | 0.003 | 4.50 | 0.20 | 0.010 | 0.0020 | — | — | 0.0020 | 0.50 | 0.0020 | — | — | |
| | A4 | 0.003 | 2.70 | 0.01 | 0.010 | 0.0020 | — | — | 0.0020 | 0.50 | 0.0020 | — | — | |
| | A5 | 0.003 | 2.70 | 5.00 | 0.010 | 0.0020 | — | — | 0.0020 | 0.50 | 0.0020 | — | — | |
| | A6 | 0.003 | 2.70 | 0.20 | 1.000 | 0.0020 | — | — | 0.0020 | 0.50 | 0.0020 | — | — | |
| | A7 | 0.003 | 3.20 | 0.60 | 0.010 | 0.0005 | — | — | 0.0003 | 1.20 | 0.0020 | — | — | |
| | A8 | 0.003 | 3.20 | 0.60 | 0.010 | 0.0050 | — | — | 0.0050 | 1.20 | 0.0020 | — | — | |
| | A9 | 0.003 | 3.20 | 0.60 | 0.010 | 0.0020 | — | — | 0.0020 | 0.01 | 0.0020 | — | — | |
| | A10 | 0.003 | 3.20 | 0.60 | 0.010 | 0.0020 | — | — | 0.0020 | 5.00 | 0.0020 | — | — | |
| | A11 | 0.003 | 3.20 | 0.60 | 0.010 | 0.0020 | — | — | 0.0020 | 1.20 | 0.0005 | — | — | |
| | A12 | 0.003 | 3.20 | 0.60 | 0.010 | 0.0020 | — | — | 0,0020 | 1.20 | 0.0050 | — | — | |
| | A13 | 0.003 | 3.20 | 0.60 | 0.010 | 0.0020 | 0.0010 | 0.0010 | 0.0040 | 1.20 | 0.0020 | — | — | |
| | A14 | 0.003 | 3.20 | 0.60 | 0.010 | 0.0020 | — | — | 0.0020 | 1.20 | 0.0020 | Cu: 1.0% | — | |
| | A15 | 0.003 | 3.20 | 0.60 | 0.010 | 0.0020 | — | — | 0.0020 | 1.20 | 0.0020 | Sn: 1.0% | — | |
| | A16 | 0.003 | 3.20 | 0.60 | 0.010 | 0.0020 | — | — | 0.0020 | 1.20 | 0.0020 | Ni: 1.0% | — | |
| | A17 | 0.003 | 3.20 | 0.60 | 0.010 | 0.0020 | — | — | 0.0020 | 1.20 | 0.0020 | Cr: 1.0% | — | |
| | A18 | 0.003 | 3.20 | 0.60 | 0.010 | 0.0020 | — | — | 0.0020 | 1.20 | 0.0020 | Sb: 1.0% | — | |
| | A19 | 0.003 | 3.20 | 0.60 | 0.010 | 0.0020 | — | — | 0.0020 | 1.20 | 0.0020 | Sn: 0.5, Sb: 0.5 | — | |
| | A20 | 0.003 | 3.20 | 0.60 | 0.010 | 0.0020 | — | — | 0.0020 | 1.20 | 0.0020 | — | Ti: 0.003% | |
| | A21 | 0.003 | 3.20 | 0.60 | 0.010 | 0.0020 | — | — | 0.0020 | 1.20 | 0.0020 | — | Nb: 0.003% | |
| | A22 | 0.003 | 3.20 | 0.60 | 0.010 | 0.0020 | — | — | 0.0020 | 1.20 | 0.0020 | — | V: 0.003% | |
| | A23 | 0.003 | 3.20 | 0.60 | 0.010 | 0.0020 | — | — | 0.0020 | 1.20 | 0.0020 | — | Zr: 0.003% | |
| | A24 | 0.003 | 2.70 | 0.20 | 0.010 | 0.0020 | — | — | 0.0020 | 0.50 | 0.0020 | Sn: 0.05% | Ti: 0.002% | |
| | A25 | 0.003 | 3.20 | 0.60 | 0.010 | 0.0020 | — | — | 0.0020 | 1.20 | 0.0020 | Cr: 0.05% | Nb: 0.002% | |
| Comparative Example | a1 | 0.006 | 3.20 | 0.60 | 0.010 | 0.0020 | — | — | 0.0020 | 1.20 | 0.0020 | — | — | |
| | a2 | 0.003 | 1.50 | 0.60 | 0.010 | 0.0020 | — | — | 0.0020 | 1.20 | 0.0020 | — | — | |
| | a3 | 0.003 | 4.70 | 0.60 | 0.010 | 0.0020 | — | — | 0.0020 | 1.20 | 0.0020 | — | — | cold rolling breakage |

TABLE 1-continued

| Steel No. | C | Si | Mn | P | S | Se | Te | Seq | Al | N | Group A elements | Group B elements | Note |
|---|---|---|---|---|---|---|---|---|---|---|---|---|---|
| a4 | 0.003 | 3.20 | 0.005 | 0.010 | 0.0020 | — | — | 0.0020 | 1.20 | 0.0020 | — | — | |
| a5 | 0.003 | 3.20 | 6.00 | 0.010 | 0.0020 | — | — | 0.0020 | 1.20 | 0.0020 | — | — | cold rolling breakage |
| a6 | 0.003 | 3.20 | 0.60 | 1.500 | 0.0020 | — | — | 0.0020 | 1.20 | 0.0020 | — | — | cold rolling breakage |
| a7 | 0.003 | 3.20 | 0.60 | 0.010 | 0.0020 | — | — | 0.0002 | 1.20 | 0.0020 | — | — | |
| a8 | 0.003 | 3.20 | 0.60 | 0.010 | 0.0020 | — | — | 0.0060 | 1.20 | 0.0020 | — | — | |
| a9 | 0.003 | 3.20 | 0.60 | 0.010 | 0.0020 | — | — | 0.0020 | 0.005 | 0.0020 | — | — | |
| a10 | 0.003 | 3.20 | 0.60 | 0.010 | 0.0020 | — | — | 0.0020 | 6.0 | 0.0020 | — | — | cold rolling breakage |
| a11 | 0.003 | 3.20 | 0.60 | 0.010 | 0.0020 | — | — | 0.0020 | 1.20 | 0.0060 | — | — | |

TABLE 2

| | Manufacturing Method No. | Hot-rolled sheet annealing process | Metal type | Metal type concentration (%) | Pickling solution | pH | Temperature of pickling solution (° C.) | Time for which pickling solution comes into contact with steel sheet (sec) | Note |
|---|---|---|---|---|---|---|---|---|---|
| Invention Example | B1 | No | Hg | 0.00001 | hydrochloric acid | 3.0 | 70 | 30 | |
| | B2 | No | Cu | 1.00000 | hydrochloric acid | 3.0 | 70 | 30 | |
| | B3 | No | Ag | 0.00100 | hydrochloric acid | −1.5 | 70 | 30 | |
| | B4 | No | Pb | 0.00100 | hydrochloric acid | 6.0 | 70 | 30 | |
| | B5 | No | Cd | 0.00100 | hydrochloric acid | 3.0 | 15 | 30 | |
| | B6 | No | Co | 0.00100 | hydrochloric acid | 3.0 | 100 | 30 | |
| | B7 | No | Zn | 0.00100 | hydrochloric acid | 3.0 | 70 | 5 | |
| | B8 | No | Ni | 0.00100 | hydrochloric acid | 3.0 | 70 | 200 | |
| | B9 | No | Cu | 0.00100 | hydrochloric acid | 3.0 | 70 | 30 | |
| | B10 | Yes | Cu | 0.00100 | hydrochloric acid | 3.0 | 70 | 30 | |
| Comparative Example | b1 | No | Cu | 0.000005 | hydrochloric acid | 3.0 | 70 | 30 | |
| | b2 | No | Cu | 0.00100 | phosphoric acid | 7.0 | 70 | 30 | |
| | b3 | Yes | Cu | 0.00100 | nitric acid | 3.0 | 10 | 30 | |
| | b4 | Yes | Cu | 0.00100 | sulfuric acid | 3.0 | 70 | 3 | |

In this case, as shown in Table 3, combinations of steels Nos. A1 to A25 as examples of the present invention and Manufacturing Methods Nos. B9 and B10 as examples of the present invention had excellent magnetic characteristics and the precipitate distribution also satisfied a specified range. Here, components of the base steel sheet after final annealing were the same as chemical components shown in Table 1.

On the other hand, combinations of steels Nos. a1 to a11 as comparative examples and Manufacturing Methods Nos. B9 and B10 as examples of the present invention had poor magnetic characteristics and a desired non-oriented electrical steel sheet could not be obtained. In addition, codes c3, c5, c6, and c10 caused rolling breakage.

TABLE 3

| | Code | Steel No. | Manufacturing Method No. | Number density $N_{0-2}$ from surface to 2 μm (pieces/μm²) | Number density $N_{2-5}$ from 2 to 5 μm (pieces/μm²) | Formula (1) $N_{2-5}/N_{0-2}$ | Iron loss $W_{15/50}$ (W/kg) | Hysteresis loss $W_{15\,h}$ (W/kg) | Formula (2) $(W_{15\,h})/(W_{15/50})$ | Note |
|---|---|---|---|---|---|---|---|---|---|---|
| Invention Example | C1 | A1 | B9 | 0.44 | 0.10 | 0.23 | 2.48 | 2.10 | 0.85 | |
| | C2 | A2 | B9 | 0.20 | 0.06 | 0.30 | 2.21 | 1.77 | 0.80 | |
| | C3 | A3 | B9 | 0.25 | 0.08 | 0.32 | 2.07 | 1.78 | 0.86 | |
| | C4 | A4 | B9 | 0.20 | 0.07 | 0.35 | 2.21 | 1.78 | 0.81 | |
| | C5 | A5 | B9 | 0.22 | 0.06 | 0.27 | 2.08 | 1.79 | 0.86 | |
| | C6 | A6 | B9 | 0.23 | 0.07 | 0.30 | 2.14 | 1.75 | 0.82 | |
| | C7 | A7 | B10 | 0.16 | 0.06 | 0.38 | 2.05 | 1.72 | 0.84 | |
| | C8 | A8 | B10 | 0.70 | 0.20 | 0.29 | 2.20 | 1.88 | 0.85 | |
| | C9 | A9 | B10 | 0.15 | 0.04 | 0.27 | 2.12 | 1.74 | 0.82 | |
| | C10 | A10 | B10 | 0.90 | 0.25 | 0.28 | 2.14 | 1.85 | 0.86 | |
| | C11 | A11 | B10 | 0.12 | 0.03 | 0.25 | 2.06 | 1.73 | 0.84 | |
| | C12 | A12 | B10 | 1.12 | 0.30 | 0.27 | 2.34 | 2.01 | 0.86 | |
| | C13 | A13 | B10 | 0.57 | 0.18 | 0.32 | 2.18 | 1.85 | 0.85 | |

TABLE 3-continued

|  | Code | Steel No. | Manufacturing Method No. | Precipitate | | Formula (1) $N_{2-5}/N_{0-2}$ | Magnetic characteristics | | Formula (2) $(W_{15\,h})/(W_{15/50})$ | Note |
|---|---|---|---|---|---|---|---|---|---|---|
|  |  |  |  | Number density $N_{0-2}$ from surface to 2 µm (pieces/µm²) | Number density $N_{2-5}$ from 2 to 5 µm (pieces/µm²) |  | Iron loss $W_{15/50}$ (W/kg) | Hysteresis loss $W_{15\,h}$ (W/kg) |  |  |
|  | C14 | A14 | B10 | 0.32 | 0.07 | 0.22 | 2.02 | 1.68 | 0.83 |  |
|  | C15 | A15 | B10 | 0.23 | 0.06 | 0.26 | 2.00 | 1.66 | 0.83 |  |
|  | C16 | A16 | B10 | 0.29 | 0.09 | 0.31 | 2.00 | 1.68 | 0.84 |  |
|  | C17 | A17 | B10 | 0.25 | 0.08 | 0.32 | 2.01 | 1.68 | 0.84 |  |
|  | C18 | A18 | B10 | 0.22 | 0.06 | 0.27 | 1.99 | 1.66 | 0.83 |  |
|  | C19 | A19 | B10 | 0.18 | 0.05 | 0.28 | 1.98 | 1.65 | 0.83 |  |
|  | C20 | A20 | B10 | 0.19 | 0.05 | 0.26 | 2.14 | 1.80 | 0.84 |  |
|  | C21 | A21 | B10 | 0.18 | 0.05 | 0.28 | 2.14 | 1.81 | 0.85 |  |
|  | C22 | A22 | B10 | 0.19 | 0.05 | 0.26 | 2.15 | 1.81 | 0.84 |  |
|  | C23 | A23 | B10 | 0.18 | 0.05 | 0.28 | 2.14 | 1.80 | 0.84 |  |
|  | C24 | A24 | B9 | 0.16 | 0.04 | 0.25 | 2.09 | 1.72 | 0.82 |  |
|  | C25 | A25 | B10 | 0.16 | 0.04 | 0.25 | 1.98 | 1.65 | 0.83 |  |
| Comparative Example | c1 | a1 | B9 | 0.46 | 0.11 | 0.24 | 2.90 | 2.54 | 0.88 |  |
|  | c2 | a2 | B9 | 0.21 | 0.07 | 0.33 | 2.26 | 1.77 | 0.78 |  |
|  | c3 | a3 | B9 | — | — | — | — | — | — | cold rolling breakage |
|  | c4 | a4 | B9 | 0.13 | 0.08 | 0.62 | 2.52 | 2.18 | 0.87 |  |
|  | c5 | a5 | B9 | — | — | — | — | — | — | cold rolling breakage |
|  | c6 | a6 | B9 | — | — | — | — | — | — | cold rolling breakage |
|  | c7 | a7 | B10 | 0.14 | 0.08 | 0.57 | 2.53 | 2.19 | 0.87 |  |
|  | c8 | a8 | B10 | 0.93 | 0.31 | 0.33 | 2.52 | 2.18 | 0.87 |  |
|  | c9 | a9 | B10 | 0.12 | 0.04 | 0.33 | 2.25 | 1.77 | 0.79 |  |
|  | c10 | a10 | B10 | — |  |  | — |  |  | cold rolling breakage |
|  | c11 | a11 | B10 | 1.28 | 0.36 | 0.28 | 2.53 | 2.20 | 0.87 |  |

Example 2

Alloys (steels Nos. A24, and A25) having chemical components shown in Table 1 were melted in a laboratory. Here, in Table 1, the contents of Cu, Sn, Ni, Cr, and Sb are listed in the column of group A elements. Similarly, the contents of Ti, Nb, V, and Zr are listed in the column of group B elements. After the above alloy was hot-rolled to have a thickness of 2.0 mm, hot-rolled sheet annealing was performed, according to Table 2 to obtain a pickled sheet under pickling conditions shown in Table 2. (Manufacturing Methods Nos. B1 to B10, and b1 to b4) The pickled sheet was subjected to cold rolling to have a thickness of 0.3 mm and subjected to final annealing to obtain a non-oriented electrical steel sheet. A test piece was cut out from the non-oriented electrical steel sheet after final annealing, and magnetic characteristics were measured according to the single, sheet magnetic characteristic test method in JIS C 2556:2015, Here, the magnetic measured value was an average value in the rolling direction and the direction perpendicular to the rolling direction. For precipitates, a steel sheet sample whose observation surface was a cross section parallel to the rolling direction and the sheet thickness direction was collected and, mirror-polished and then observed through SEM-EDS. The obtained backscattered electron image was subjected to image analysis and the number density of precipitates with an equivalent circle diameter of 50 to 500 nm present in a range of 2.0 µm from the surface of the steel sheet in the sheet thickness direction and in a range of 2.0 to 5.0 µm from the surface of the steel sheet in the sheet thickness direction was measured. The number density of precipitates was analyzed in 10 fields of view in an area of 5 µm×10 µm.

In, this case, as shown in Table 4, combinations of steels Nos. A24 and A25 as examples of the present invention and Manufacturing Methods Nos. B1 to B10 as examples of the present invention had excellent magnetic characteristics, and the precipitate distribution also satisfied a specified range. Here, components of the base steel sheet after final annealing were the same as chemical components shown in Table 1.

On the other hand, combinations of steels Nos. a1 to a11 as comparative examples and Manufacturing Methods Nos. B9 and B10 as examples of the present invention had poor magnetic characteristics, and a desired non-oriented electrical steel sheet could not be obtained.

TABLE 4

|  | Code | Steel No. | Manufacturing Method No. | Precipitate | | Formula (1) $N_{2-5}/N_{0-2}$ | Magnetic characteristics | | Formula (2) $(W_{15\,h})/(W_{15/50})$ | Note |
|---|---|---|---|---|---|---|---|---|---|---|
|  |  |  |  | Number density $N_{0-2}$ from surface to 2 µm (pieces/µm²) | Number density $N_{2-5}$ from 2 to 5 µm (pieces/µm²) |  | Iron loss $W_{15/50}$ (W/kg) | Hysteresis loss $W_{15\,h}$ (W/kg) |  |  |
| Invention Example | D1 | A24 | B1 | 0.16 | 0.06 | 0.38 | 2.39 | 2.00 | 0.84 |  |
|  | D2 | A24 | B2 | 0.18 | 0.03 | 0.17 | 2.14 | 1.75 | 0.82 |  |

TABLE 4-continued

| | Code | Steel No. | Manufacturing Method No. | Precipitate Number density $N_{0-2}$ from surface to 2 μm (pieces/μm²) | Precipitate Number density $N_{2-5}$ from 2 to 5 μm (pieces/μm²) | Formula (1) $N_{2-5}/N_{0-2}$ | Magnetic characteristics Iron loss $W_{15/50}$ (W/kg) | Magnetic characteristics Hysteresis loss $W_{15h}$ (W/kg) | Formula (2) $(W_{15h})/(W_{15/50})$ | Note |
|---|---|---|---|---|---|---|---|---|---|---|
| | D3 | A24 | B3 | 0.17 | 0.03 | 0.18 | 2.13 | 1.74 | 0.82 | |
| | D4 | A24 | B4 | 0.15 | 0.06 | 0.40 | 2.41 | 2.02 | 0.84 | |
| | D5 | A24 | B5 | 0.16 | 0.06 | 0.38 | 2.41 | 2.01 | 0.83 | |
| | D6 | A24 | B6 | 0.17 | 0.03 | 0.18 | 2.14 | 1.75 | 0.82 | |
| | D7 | A24 | B7 | 0.16 | 0.06 | 0.38 | 2.39 | 2.05 | 0.86 | |
| | D8 | A25 | B8 | 0.16 | 0.03 | 0.19 | 2.06 | 1.73 | 0.84 | |
| | D9 | A25 | B9 | 0.16 | 0.04 | 0.25 | 2.09 | 1.75 | 0.84 | |
| | D10 | A25 | B10 | 0.16 | 0.04 | 0.25 | 1.98 | 1.65 | 0.83 | |
| Comparative Example | d1 | A24 | b1 | 0.19 | 0.11 | 0.58 | 2.54 | 2.16 | 0.85 | |
| | d2 | A25 | b2 | 0.18 | 0.11 | 0.61 | 2.52 | 2.18 | 0.87 | |
| | d3 | A24 | b3 | 0.19 | 0.11 | 0.58 | 2.56 | 2.18 | 0.85 | |
| | d4 | A25 | b4 | 0.19 | 0.12 | 0.63 | 2.53 | 2.19 | 0.87 | |

INDUSTRIAL APPLICABILITY

As described above, according to the present invention, a non-oriented electrical steel sheet having excellent magnetic characteristics can be manufactured and has high applicability.

The invention claimed is:

1. A non-oriented electrical steel sheet including a base material, the base material containing, as chemical components, in mass %,
C: 0.005% or less,
Si: 2.0% or more and 4.5% or less,
Mn: 0.01% or more and 5.00% or less,
a total amount of one or more of S, Se and Te: 0.0003% or more and 0.0050% or less,
Al: 0.01% or more and 5.00% or less,
N: 0.0005% or more and 0.0050% or less, and
P: 1.0% or less,
Cu: 1.0% or less,
Sn: 1.0% or less,
Ni: 1.0% or less,
Cr: 1.0% or less,
Sb: 1.0% or less, with the remainder being Fe and impurities,
wherein, in a cross section of the base material in a sheet thickness direction, a number density $N_{2-5}$ of precipitates with an equivalent circle diameter of 50 to 500 nm present in a range of 2.0 to 5.0 μm from a surface of the base material in the sheet thickness direction is 0.30 pieces/μm² or less, and
wherein a relationship between the number density $N_{2-5}$ and a number density $N_{0-2}$ of precipitates with an equivalent circle diameter of 50 to 500 nm present in a range from the surface of the base material to 2.0 μm satisfies Formula (1):

$$(N_{2-5})/(N_{0-2}) \leq 0.4 \qquad \text{Formula (1)}.$$

2. The non-oriented electrical steel sheet according to claim 1,
wherein the chemical components of the base material further contain, in mass %, one or more selected from the group consisting of
Ti: 0.0010% or more and 0.0030% or less,
Nb: 0.0010 or more and 0.0030% or less,
V: 0.0010 or more and 0.0030% or less, and
Zr: 0.0010 or more and 0.0030% or less.

3. The non-oriented electrical steel sheet according to claim 1,
wherein an iron loss $W_{15/50}$ is 2.5 W/kg or less, and a relationship between the iron loss $W_{15/50}$ and a hysteresis loss $W_{15h}$ satisfies Formula (2):

$$0.8 \leq (W_{15h})/(W_{15/50}) \qquad \text{Formula (2)}.$$

4. The non-oriented electrical steel sheet according to claim 2,
wherein an iron loss $W_{15/50}$ is 2.5 W/kg or less, and a relationship between the iron loss $W_{15/50}$ and a hysteresis loss $W_{15h}$ satisfies Formula (2):

$$0.8 \leq (W_{15h})/(W_{15/50}) \qquad \text{Formula (2)}.$$

5. A method for manufacturing the non-oriented electrical steel sheet according to claim 1, comprising:
a process in which molten steel is cast to obtain a slab;
a hot rolling process in which the slab is heated and then hot-rolled to form a hot-rolled steel sheet;
a pickling process in which the hot-rolled steel sheet is pickled to obtain a pickled sheet;
a cold rolling process in which the pickled sheet is cold-rolled to obtain a cold-rolled steel sheet; and
a final annealing process in which the cold-rolled steel sheet is subjected to final annealing,
wherein a pickling solution used in the pickling process contains one or more of Cu, Hg, Ag, Pb, Cd, Co, Zn, and Ni and has a total concentration of respective elements of 0.00001% or more and 1.00000% or less in mass %, a pH of −1.5 or more and 6.0 or less, and a liquid temperature of 15° C. or higher and 100° C. or lower, and pickling is performed for a time of 5 seconds or longer and 200 seconds or shorter for which the hot-rolled steel sheet comes into contact with the pickling solution.

6. The method for manufacturing a non-oriented electrical steel sheet according to claim 5, comprising a hot-rolled sheet annealing process in which the hot-rolled steel sheet is subjected to hot-rolled sheet annealing to obtain a hot-rolled annealed sheet between the hot rolling process and the pickling process.

7. A method for manufacturing the non-oriented electrical steel sheet according to claim 2, comprising:
a process in which molten steel is cast to obtain a slab;
a hot rolling process in which the slab is heated and then hot-rolled to form a hot-rolled steel sheet;

a pickling process in which the hot-rolled steel sheet is pickled to obtain a pickled sheet;

a cold rolling process in which the pickled sheet is cold-rolled to obtain a cold-rolled steel sheet; and a final annealing process in which the cold-rolled steel sheet is subjected to final annealing, wherein a pickling solution used in the pickling process contains one or more of Cu, Hg, Ag, Pb, Cd, Co, Zn, and Ni and has a total concentration of respective elements of 0.00001% or more and 1.00000% or less in mass %, a pH of −1.5 or more and 6.0 or less, and a liquid temperature of 15° C. or higher and 100° C. or lower, and pickling is performed for a time of 5 seconds or longer and 200 seconds or shorter for which the hot-rolled steel sheet comes into contact with the pickling solution.

8. The method for manufacturing a non-oriented electrical steel sheet according to claim 7, comprising a hot-rolled sheet annealing process in which the hot-rolled steel sheet is subjected to hot-rolled sheet annealing to obtain a hot-rolled annealed sheet between the hot rolling process and the pickling process.

9. A method for manufacturing the non-oriented electrical steel sheet according to claim 3, comprising:

a process in which molten steel is cast to obtain a slab;

a hot rolling process in which the slab is heated and then hot-rolled to form a hot-rolled steel sheet;

a pickling process in which the hot-rolled steel sheet is pickled to obtain a pickled sheet;

a cold rolling process in which the pickled sheet is cold-rolled to obtain a cold-rolled steel sheet; and a final annealing process in which the cold-rolled steel sheet is subjected to final annealing, wherein a pickling solution used in the pickling process contains one or more of Cu, Hg, Ag, Pb, Cd, Co, Zn, and Ni and has a total concentration of respective elements of 0.00001% or more and 1.00000% or less in mass %, a pH of −1.5 or more and 6.0 or less, and a liquid temperature of 15° C. or higher and 100° C. or lower, and pickling is performed for a time of 5 seconds or longer and 200 seconds or shorter for which the hot-rolled steel sheet comes into contact with the pickling solution.

10. The method for manufacturing a non-oriented electrical steel sheet according to claim 9, comprising a hot-rolled sheet annealing process in which the hot-rolled steel sheet is subjected to hot-rolled sheet annealing to obtain a hot-rolled annealed sheet between the hot rolling process and the pickling process.

11. A method for manufacturing the non-oriented electrical steel sheet according to claim 4, comprising:

a process in which molten steel is cast to obtain a slab;

a hot rolling process in which the slab is heated and then hot-rolled to form a hot-rolled steel sheet;

a pickling process in which the hot-rolled steel sheet is pickled to obtain a pickled sheet;

a cold rolling process in which the pickled sheet is cold-rolled to obtain a cold-rolled steel sheet; and a final annealing process in which the cold-rolled steel sheet is subjected to final annealing, wherein a pickling solution used in the pickling process contains one or more of Cu, Hg, Ag, Pb, Cd, Co, Zn, and Ni and has a total concentration of respective elements of 0.00001% or more and 1.00000% or less in mass %, a pH of −1.5 or more and 6.0 or less, and a liquid temperature of 15° C. or higher and 100° C. or lower, and pickling is performed for a time of 5 seconds or longer and 200 seconds or shorter for which the hot-rolled steel sheet comes into contact with the pickling solution.

12. The method for manufacturing a non-oriented electrical steel sheet according to claim 11, comprising a hot-rolled sheet annealing process in which the hot-rolled steel sheet is subjected to hot-rolled sheet annealing to obtain a hot-rolled annealed sheet between the hot rolling process and the pickling process.

\* \* \* \* \*